(12) United States Patent
Kosugi

(10) Patent No.: US 7,451,864 B2
(45) Date of Patent: Nov. 18, 2008

(54) CLUTCH ACTUATOR FOR STRADDLE-TYPE VEHICLE

(75) Inventor: Makoto Kosugi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 416 days.

(21) Appl. No.: 11/301,646

(22) Filed: Dec. 12, 2005

(65) Prior Publication Data

US 2006/0169562 A1 Aug. 3, 2006

(30) Foreign Application Priority Data

Dec. 10, 2004 (JP) ............................... 2004-359227

(51) Int. Cl.
*F16D 29/00* (2006.01)
(52) U.S. Cl. ...................... 192/83; 192/90; 192/91 R; 192/99 S
(58) Field of Classification Search .................. 192/90
See application file for complete search history.

(56) References Cited

U.S. PATENT DOCUMENTS

| | | | | |
|---|---|---|---|---|
| 4,852,419 A | * | 8/1989 | Kittel et al. ................. 74/89.14 |
| 5,413,200 A | * | 5/1995 | Hirata .......................... 192/40 |
| 5,839,561 A | * | 11/1998 | Koda et al. .................... 192/90 |
| 5,964,680 A | | 10/1999 | Salecker et al. ................ 477/74 |
| 6,026,945 A | * | 2/2000 | Imao et al. ................. 192/91 R |
| 6,524,224 B2 | | 2/2003 | Gagnon et al. .............. 477/175 |
| 6,569,057 B2 | | 5/2003 | Jones et al. ..................... 477/74 |
| 6,896,112 B2 | | 5/2005 | Berger et al. ................ 192/52.4 |
| 6,910,987 B2 | | 6/2005 | Richards ...................... 475/283 |
| 7,000,717 B2 | | 2/2006 | Ai et al. ....................... 180/65.2 |
| 2003/0121749 A1 | * | 7/2003 | Katou et al. .............. 192/85 R |

FOREIGN PATENT DOCUMENTS

| | | |
|---|---|---|
| EP | 385629 | 9/1990 |
| EP | 742386 | 11/1996 |
| JP | 6-8903 | 3/1994 |

* cited by examiner

*Primary Examiner*—Richard M. Lorence
(74) *Attorney, Agent, or Firm*—Knobbe, Martens, Olson & Bear, LLP

(57) ABSTRACT

A clutch actuator is provided to stabilize a state of clutch engagement. A rotating member is rotationally driven on a rotating shaft by a motor. A clutch operating member includes two ends. One end of the clutch operating member is pushed by a push force of a clutch spring and the other end is pivotally supported on the rotating member by a shaft. The clutch operating member disengages the clutch when moved in a direction against the force of the clutch spring. An auxiliary biasing mechanism also acts on the rotating member. One end of the auxiliary biasing member is supported on a vehicle side and the other end is pivotally supported on the rotating member by a shaft. The auxiliary biasing member can include a compressible coil spring. The rotating member rotates in a first direction to move the clutch operating member in a direction of clutch engagement. When the clutch is engaged, the combined torque on the rotating member, which is produced by forces asserted by the auxiliary biasing mechanism and the clutch operating member, bias the rotating member in the first direction.

19 Claims, 9 Drawing Sheets

US 7,451,864 B2

CLUTCH ACTUATOR FOR STRADDLE-TYPE VEHICLE

CROSS-REFERENCE TO RELATED APPLICATIONS

The present application is based on and claims priority under 35 U.S.C. § 119 to Japanese Patent Application No. 2004-359227 filed on Dec. 10, 2005, the entire contents of which is expressly incorporated by reference herein.

BACKGROUND OF THE INVENTION

1. Field of the Invention

The present invention relates to a clutch actuator for a straddle-type vehicle and, more particular, to a clutch actuator mechanism to effect clutch engagement and disengagement with a smaller motor size.

2. Description of the Related Art

Clutch actuators often use a motor to cause a clutch mounted on a vehicle to move between an engaged state and a disengaged state. Normally, a biasing force acts to engage the clutch. In order to disengage the clutch, the motor must increase its output to overcome the biasing force. Some of such clutch actuators, such as that disclosed in Japanese Patent Publication No. 2000-501826, comprises elastic auxiliary means that enables reducing the power output required by the motor by canceling a portion of the biasing force with a counteracting elastic force generated by the elastic auxiliary means (see FIG. 2 of the Japanese patent publication).

With the related art, however, the force in the direction of clutch engagement and an elastic force of the elastic auxiliary means are caused to balance each other in the clutched state so that biasing the force in the direction of clutch engagement does not act on the clutch when the clutch is engaged. As a result, such prior clutch actuators can have insufficient stability with the clutch engaged.

A need therefore exists for an improved clutch actuator that has a reduced size and increased stability over prior actuator designs.

SUMMARY OF THE INVENTION

In accordance with one aspect of the present invention, a clutch actuator mechanism is provided for operating a vehicle clutch between at least an engaged state and a disengaged state. The clutch actuator mechanism comprises an actuator and a rotating member rotationally driven by the actuator about an axis. A clutch operating member has at least first and second end sections. The first end section is arranged to work against a clutch biasing member, which biases the clutch toward an engaged state, at least during the disengaged state. The second end section is pivotally coupled to the rotating member at a location offset from the axis. An auxiliary biasing member of the clutch actuator mechanism also has first and second end sections. The first end section is coupled to the rotating member at a location also offset from the axis and spaced apart from the first end section of the clutch operating member. The second end section is generally fixed relative to the first end section such that movement of the first end section moves relative to the second end section. Rotation of the rotating member in a first direction causes the clutch operating member to move through a range of motion from a first position to a second position. The first position corresponds to the disengaged state of the clutch and the second position corresponding to the engaged state of the clutch. The auxiliary biasing member and the clutch operating member are arranged so as to work together against the clutch biasing member through at least a portion of the range of movement as the rotating member rotates in the first direction.

In a preferred mode, the rotating member can rotate in a second, reverse direction to move the clutch operating member in a direction of clutch disengagement. The auxiliary biasing member and the clutch operating member are further arranged so as to work together against the clutch biasing member through at least a portion of the rotational movement of the rotating member in the second, reverse direction.

It is further preferred that the second end section of the clutch operating member is arranged to exert a first torque on the rotating member under the force of the clutch biasing member at least during a semi-clutched state of the clutch, and the auxiliary biasing mechanism is arranged to exert a second torque on the rotating member at least during the semi-clutched state. The first and second torques are generally of equal by opposite value to each other during at least the semi-clutched state so as substantially to offset each other.

In an additional preferred mode, the auxiliary biasing mechanism is arranged so as to produce a torque on the rotating member in a direction promoting clutch engagement at least when the rotating member lies in a position corresponding to the engaged state of the clutch. The auxiliary biasing mechanism can further be arranged to produce a torque on the rotating member in a direction promoting clutch disengagement at least when the rotating member lies in a position corresponding to the disengaged state of the clutch. Furthermore, the clutch operating member can be arranged so as to produce substantially no torque on the rotating member when the rotating member lies in a position corresponding to the engaged state. Therefore, it is possible to rotationally drive the rotating member with a relatively small torque, thus enabling making an actuator (e.g., a motor) small in size. As a result, it is possible to lighten a straddle-type vehicle and to optimize its weight balance.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 9 figures.

DETAILED DESCRIPTION OF THE PREFERRED EMBODIMENT

Figure 1:
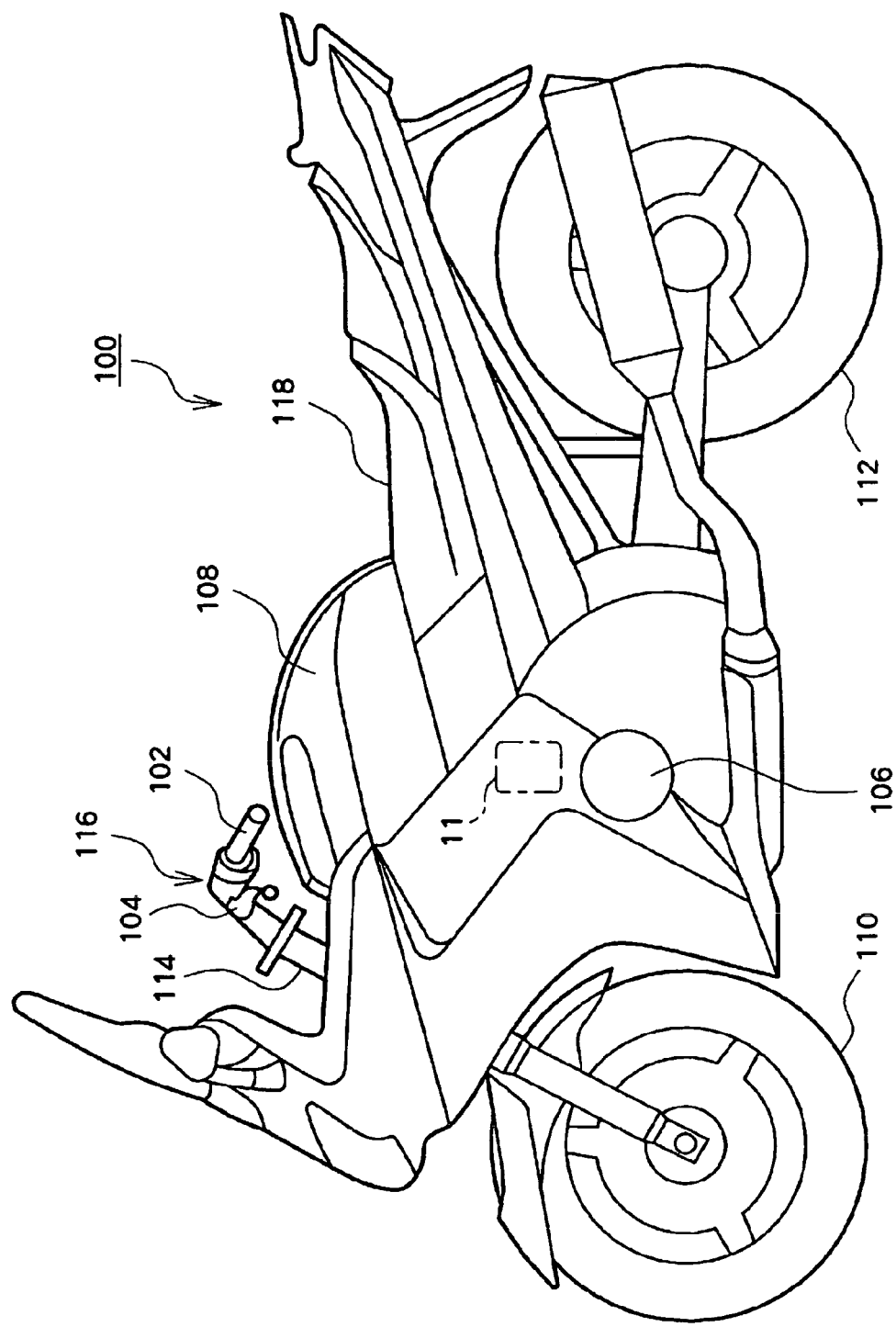
FIG. 1 is a side elevational view showing an outward appearance of a straddle-type vehicle including a clutch actuator mechanism configured in accordance with a preferred embodiment of the invention.

FIG. 1 is a side view showing an outward appearance of a motorcycle that includes a clutch actuator mechanism 11, which is configured in accordance with a preferred embodiment of the present invention. The motorcycle 100 shown in the figure is an example of a straddle-type vehicle and comprises front and rear wheels 110, 112. A handlebar 116 extends transversely (i.e., perpendicular to a vehicle traveling direction) and is mounted to a top of a front fork 114. The front wheel 110 is connected to a lower portion of the front fork 114. A grip 102 and a clutch lever 104 are disposed at one end of the handlebar and an accelerator grip and a brake lever (not shown) are disposed at the other end of the handlebars. Also, a seat 118 is provided on an upper side of the motorcycle 100 and positioned such that a rider can get on the motorcycle 100, straddling the seat 118, and grasp the handlebar. The overall construction of the motorcycle 100 is substantially the same in construction as known motorcycles. Additionally, while the present clutch actuator mechanism 11 is illustrated in connection with a motorcycle, it can also be used with other types of vehicles as well, including, but not limited to, ATV, four-wheeled buggies, scooters, motorbike, sport bikes, dirt bikes, snowmobiles and the like.

The motorcycle 100 includes the clutch actuator mechanism 11 that uses a motor to operate a clutch, which preferably is located in a crankcase of the engine. The clutch actuator mechanism 11 in the illustrated embodiment is mounted above the engine 106 and below a fuel tank 108. The operation of the clutch actuator mechanism 11 is controlled by a control device (not shown). The clutch actuator mechanism 11 engages and disengages the clutch normally under the drive of the electric motor rather than by manual operation, as described in detail below. However, a cable does connect the clutch lever 104 to the clutch actuator mechanism 11 to allow for manual operation of the clutch actuator mechanism 11 using the clutch lever 104.

Figure 2:
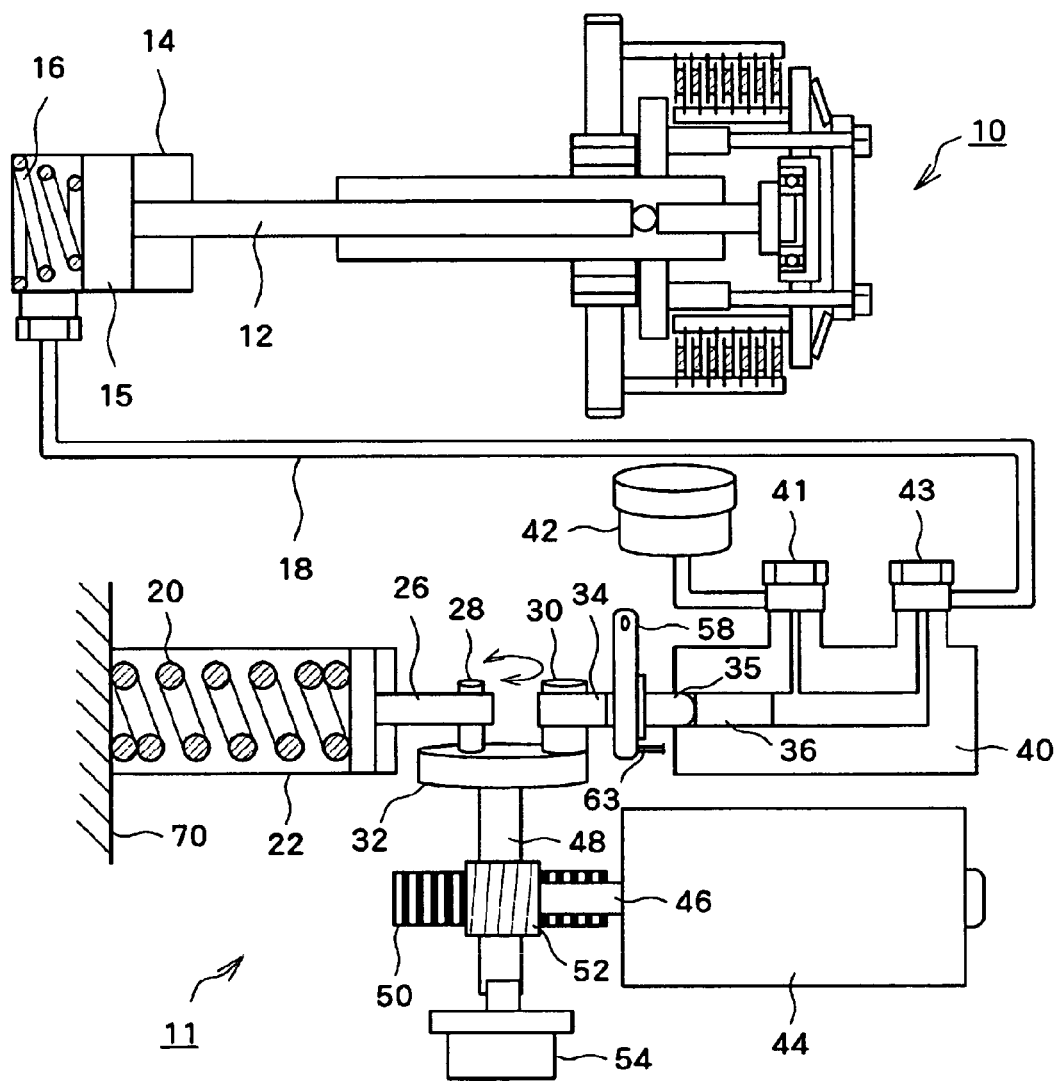
FIG. 2 is a view schematically showing the construction of a control system including the clutch actuator mechanism.

With reference to FIG. 2, the schematic drawing illustrates a clutch system that includes a clutch mechanism 10 and the clutch actuator mechanism 11, which are configured in accordance with a preferred embodiment. With the clutch control system shown in the figure, for example, a wet type multiple-disc clutch 10 is accommodated in a crankcase of the engine 106. The clutch actuator mechanism 11 can place the clutch 10 in a disengaged state or in an engaged state using a push rod 12. The clutch 10 comprises a clutch spring whose biasing force pushes clutch discs together. The clutch 10 operates between a crankshaft and a transmission main shaft (on a driven side). A first set of the clutch discs are coupled to the crankshaft (on a drive side of the clutch) and a second set of the clutch discs are coupled to the main shaft (on a driven side of the clutch). Therefore, the clutch 10 is normally engaged under the bias of the clutch spring. The clutch 10 can be put in a semi-clutched state by pushing the push rod 12 toward the clutch 10 against the push force of the clutch spring, and put in a disengaged state by further pushing the push rod 12.

With the illustrated clutch control system, the push rod 12 of the clutch 10 is pushed by a hydraulic mechanism. The hydraulic mechanism preferably comprises an oil hose 18, a clutch release cylinder 14 connected to one end of the oil hose, and a master cylinder 40 connected to the other end of the oil hose through a connector 43. Disposed in the clutch release cylinder 14 are a piston 15, which is pushed by oil flowing from the oil hose 18, and a clutch release spring 16, that biases the piston 15 toward the clutch 10 to inhibit closing off the connected end of the oil hose 18. When the oil inflows from the oil hose 18, the piston 15 is moved toward the clutch 10 to thereby push the push rod 12. As a result, the clutch 10 is put in a semi-clutched state or in a disengaged state. Also, when the oil clutch release cylinder 14 flows toward the master cylinder 40, the push rod 12 is pushed back by the clutch spring, the piston 15 also returns to an original position, and the clutch 10 returns to its engaged state.

A reservoir tank 42 is connected to the master cylinder 40 through a connector 41. Oil in the reservoir tank 42 flows into the master cylinder 40 to make up any volume change of an oil in the hydraulic mechanism caused by abrasion of the clutch 10, temperature, etc. Alternatively, oil in the master cylinder 40 can be recovered by the reservoir tank 42 when, for example, the volume of oil increases with a significant temperature increase. A piston 36 is operates in the master cylinder 40. The piston 36 is pushed from outside the cylinder to force oil out the master cylinder 40 and thereby cause oil to flow into the clutch release cylinder 14 through the oil hose 18.

A clutch actuator mechanism 11, according to the illustrated embodiment, comprises a master cylinder 40, and a mechanism that that pushes the master cylinder piston 36 and that releases the pushed piston 36. Specifically, the piston 36 of the master cylinder 40 preferably is pushed by a first piston push rod 35 (which is an example of a clutch operating member). The first piston push rod 35 is pushed by either a manipulation arm 58 or a second piston push rod 34. Both the manipulation arm 58 and the second piston push rod 34 are provided in a manner to be able to abut independently against the first piston push rod 35. The manipulation arm 58 is connected to the clutch lever 104 through a length of cable 63, and when a rider of a straddle-type vehicle operates the clutch lever 104, the manipulation arm 58 is moved by the wire 63. Thereby, the manipulation arm 58 pushes the first piston push rod 35 and the piston 36 is pushed toward the interior of the master cylinder 40. Also, when the rider returns the clutch lever 104 to its original position, the manipulation arm 58 is returned to its initial position whereby the piston 36 is also returned to its original position under the bias of the clutch spring.

The second piston push rod 34 is driven by the motor 44 (which is an example of an actuator) to push the first piston push rod 35 independently of the manipulation arm 58. With the second piston push rod 34 acting against the first piston push rod 35, the piston 36 is pushed toward the interior of the master cylinder 40. When motor 44 rotates in reverse, the second piston push rod 34 returns to its initial position (a clutch engaged position) and the clutch 10 correspondingly returns to an engaged state under the bias of the clutch spring.

In the illustrated embodiment, the second piston push rod 34 has one end thereof abutting against a head of the first piston push rod 35 and has the other end thereof rotatably journaled on a rotating member or turn table 32 through a coupling shaft 30. The rotating member 32 is rotationally driven by the motor 44 and rotatably journaled by an actuator casing 70 (FIG. 4), in which respective elements of the clutch actuator mechanism 11 are accommodated. The rotating shaft 30 of the second piston push rod 34 is provided in parallel to but is separated apart from a rotating shaft 48 of the rotating member 32. The rotating shaft 48 mounts onto a worm wheel 50 such that the worm wheel 50 and the rotating member 32 rotate together. A worm gear 52 meshes with the worm wheel 50. The worm gear 52 is joined to the motor 44 through a rotating shaft 46 of the motor 44. Thus the clutch actuator mechanism 11 converts rotational drive of the motor 44 into rotation of the rotating member 32.

As described above, a force that operates the clutch 10 in a direction of engagement is applied to the push rod 12 by the clutch spring provided in the clutch 10. Therefore, in order to cause the second piston push rod 34 to push the piston 36, the motor 44 must rotate the rotating member 32 against such force.

An auxiliary biasing mechanism 22 is further coupled to the rotating member 32 to be able to decrease the required output of the motor 44 to drive the rotating member 32 between positions corresponding to the engaged and disengaged states of the clutch 10. In the illustrated embodiment, the rotating member 32 comprises a second coupling shaft 28 for coupling an ending of the auxiliary biasing mechanism 22 to the rotating member 32. The coupling shaft 28 lies parallel to the rotating shaft 48 but is spaced apart from the rotating shaft 48 as well as from the other coupling shaft 30. The auxiliary biasing mechanism 22 in the illustrated embodiment comprises at least one auxiliary spring shaft 26 (and preferably a second spring shaft, as described below in connection with FIG. 3). One end of the auxiliary spring shaft 26 is supported rotatably on the coupling shaft 28, and the other end of the auxiliary biasing member 22 acts against the actuator casing 70, in which respective elements of the clutch actuator 11 are accommodated. The auxiliary biasing mechanism 22, in the illustrated embodiment, includes a coil spring 20 that is compressed into a state of being shorter than its natural length (its length in an un-deflected state) when the clutch is engaged. One end of the coil spring 20 acts against and is fixed by the inner wall of the actuator casing 70, which is fixed on the motorcycle, and the other end of the coil spring 20 pushes against the first auxiliary spring shaft 26. In this manner, the force of the coil spring 20 causes the first auxiliary spring shaft 26 to push the rotating shaft 28 in a direction allowing expansion of the spring 20, thus imparting an auxiliary torque to the rotating shaft 28 through at least a portion of the rotating member's travel.

As seen in FIG. 2, a clutch potentiometer 54 preferably is coupled to the worm wheel 50. The clutch potentiometer 54 in the illustrated embodiment comprises a resistor so that a voltage value corresponding to a rotational angle of the rotating member 32 is output. The voltage value is input into a control device (not shown), which comprises a microprocessor or the like, to provide feedback for the operational control of at least the motor 44. That is, the control device determines a rotational angle of the rotating member 32 from an output voltage of the clutch potentiometer 54 to be able to set the rotating member 32 to an operational angle between a rotational angle corresponding to an engaged state of the clutch 10 and a rotational angle corresponding to a disengaged state of the clutch 10. In addition or in the alternative to sensing the rotational position of the worm wheel 50, the rotational position of the motor shaft 46 can also be senses for control, feedback and diagnostic purposes.

Figure 3:
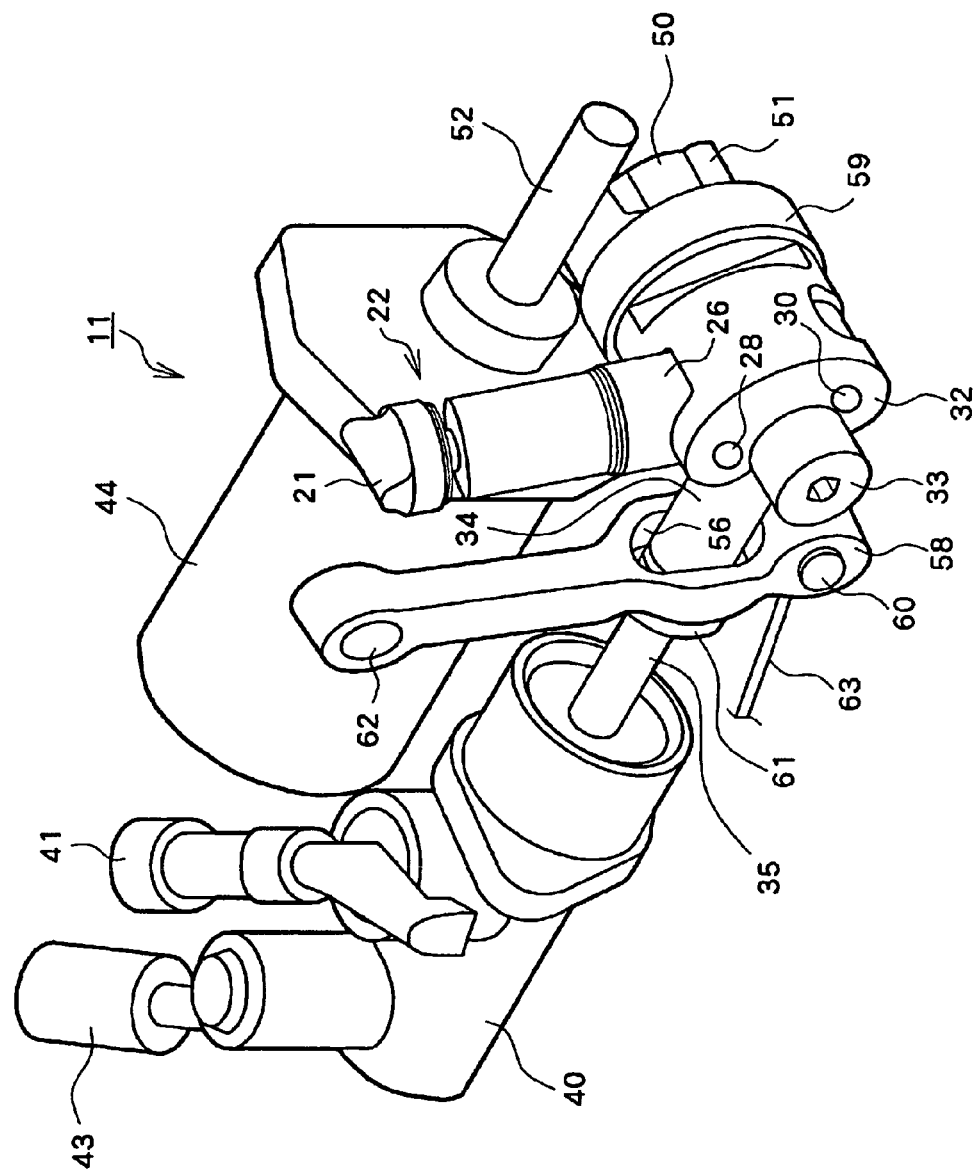
FIG. 3 is a perspective view showing an outward appearance of a principal part of the clutch actuator mechanism.
Figure 4:
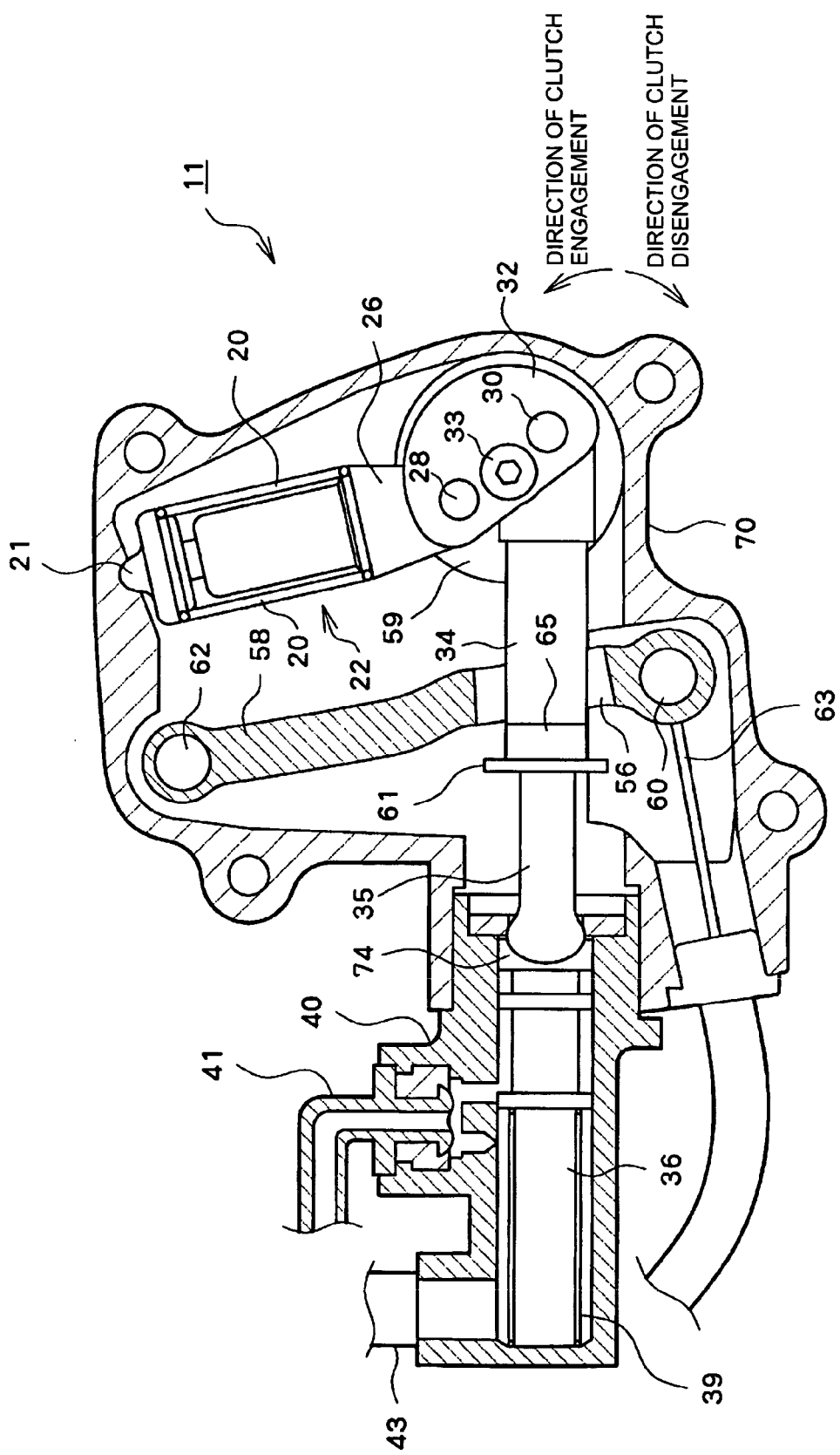
FIG. 4 is a longitudinal, cross sectional view showing the clutch actuator mechanism at the time of clutch engagement.
Figure 5:
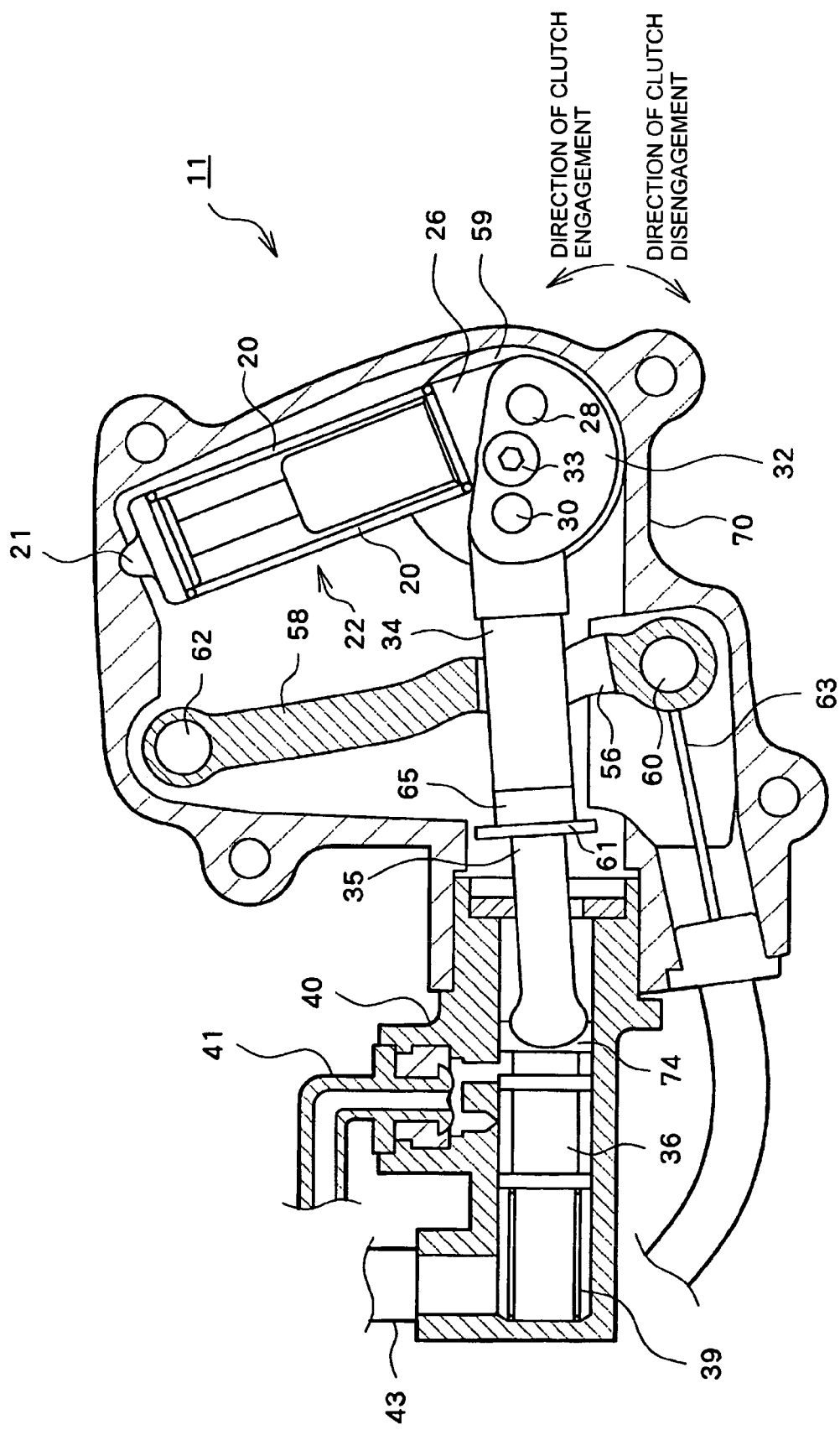
FIG. 5 is a longitudinal, cross sectional view showing the clutch actuator mechanism at the time of clutch disengagement.

A further explanation is given to the clutch actuator mechanism 11 will not be provided in connection with FIGS. 3 through 5. FIG. 3 is a perspective view showing an outward appearance of most of the clutch actuator mechanism 11. FIG. 4 is a longitudinal, cross sectional view showing the clutch actuator mechanism 11 at the time of clutch engagement. FIG. 5 is a longitudinal, cross sectional view showing the clutch actuator mechanism 11 at the time of clutch disengagement. In FIG. 3, illustration of the actuator casing 70 and the coil spring 20 is omitted, and in FIGS. 4 and 5, the motor 44, a rotation restricting members 51 (FIG. 3), the worm wheel 50, and the worm gear 52 hide behind the actuator casing 70 and so are not shown.

The actuator casing 70 preferably is shaped such that partitions are provided upright around a periphery of a flat bottom plate, and accommodates therein respective elements centering around the rotating member 32. A bearing is fitted into a recess provided with an opening and formed on a bottom of the actuator casing 70, and the rotating shaft 48 of the rotating member 32 is inserted through the bearing. In the illustrated embodiment, the auxiliary biasing mechanism 22 comprises the first auxiliary spring shaft 26 and a second auxiliary spring shaft 21. The first auxiliary spring shaft 26 is cylindrically shaped at one end thereof and permits one end of the second auxiliary spring shaft 21 to be inserted therethrough, so that the both can slide relative to each other. The coil spring 20 is disposed between the first auxiliary spring shaft 26 and the second auxiliary spring shaft 21. The coil spring 20 biases the first auxiliary spring shaft 26 and the second auxiliary spring shaft 21 to slide apart from each other. A shaft hole is formed on the other end of the first auxiliary spring shaft 26 and pivotally attaches to the coupling shaft 28 of the rotating member 32. The other end of the second auxiliary spring shaft 21 is formed with a projection that is configured to fit into a recess formed on a side wall of the actuator casing 70. The illustrated auxiliary biasing mechanism 22 thus is accommodated in the actuator casing 70 with the coil spring 20 being compressed, thus imparting torque to the rotating member 32.

The master cylinder 40 is fitted into the actuator casing 70 from the side and the first piston push rod 35 extends into the interior of the actuator casing 70. One end of the first piston push rod 35 is formed to be substantially ball shaped to be held by a cup or socket 74 connected to the piston 36. The cup 74 and the substantially spherical-shaped end enable the first piston push rod 35 to push the piston 36 through a range of linear motion. The bias of the clutch spring and the bias of a master cylinder spring 39 provided in the master cylinder 40 cause the cup 74 constantly to contact constantly the substantially spherical-shaped end of the first piston push rod 35.

As seen in FIG. 4, a somewhat large diameter actuator abutment 65 is formed generally at the midway of the first piston push rod 35. An annular collar or arm abutment 61 preferably extends from the first piston push rod 35 at an end of the abutment 65 that lies closer to the master cylinder 40.

The first piston push rod 35 includes a tip end 37 that extends from the abutment 65 toward the rotating member 32. The diameter of the tip end 37 is smaller than the diameter of the abutment 65.

The second piston push rod 34 includes a hollow to receive the tip end 37 of the first piston push rod 35. Thus the first piston push rod 35 can slide relative to the second piston push rod 34, which is pivotally supported on the rotating member 32 through the coupling shaft 30. As described above, the first piston push rod 35 is constantly biased into the second piston push rod 34 with the abutment 65 contacting the tip end surface of the second piston push rod 34. In the case where the first piston push rod 35 is pushed into the master cylinder 40 by the lever arm 58, the first piston push rod 35 slides out from the second piston push rod 34. In this case, engagement of the tip end surface of the second piston push rod 34 with the actuator abutment 65 is released.

One end of the manipulation or lever arm 58 is pivotally supported on a support shaft 62 fixed to the bottom of the actuator casing 70. The other end of the manipulation arm mounts is connected to the cable 63 via a pin 60. The cable 63 extends from the clutch lever 104 on the handlebar, as noted above. An opening 56 is formed at the midway of the manipulation arm 58 and the second piston push rod 34 is inserted through the opening 56. As described above, the first piston push rod 35 is inserted into the tip end of the second piston push rod 34. The arm abutment 61 is positioned on a side of the opening 56 toward the master cylinder 40. Therefore, when the clutch lever 104 is manipulated to move free end of the manipulation arm toward the master cylinder 40, a periphery of the opening 56 abuts against the arm abutment 61 to push the first piston push rod 35 into the master cylinder 40.

As best seen in FIGS. 3 and 4, the rotating member 32 preferably is formed with a rotating member manipulating part 33. The head of the rotating member manipulating part 33 is formed with one or more tool holes into which a tool, such as hex wrench, etc. is inserted. The tool hole is formed to be concentric with the rotating shaft 48, so that the rotating member 32 can be rotated manually and forcedly from outside by inserting a tool into the tool hole. In addition, the rotating shaft 46 of the motor 44 may be manually rotated from outside to thereby rotate the rotating member 32.

The rotating shaft 48 of the rotating member 32 is inserted through the bearing 59 and a tip end thereof is positioned on the back side of the bottom plate of the actuator casing 70. The worm wheel 50 is mounted to the tip end of the rotating shaft 48. The worm wheel 50 is formed with teeth, which are necessary and sufficient to rotate the rotating member 32 from a rotational angle corresponding to clutch engagement to a rotational angle corresponding to clutch disengagement. In a preferred mode, the remainder of the worm wheel is not formed with teeth. Formed on a back surface side of the bottom of the actuator casing 70 are a pair of rotation restricting members 51 (only one of them being shown in FIG. 3) adjacent to a region in which the teeth formed on the worm wheel 50 are movable. When the rotating member 32 reaches the rotational angle corresponding to clutch engagement, one side of the teeth of the worm wheel 50 abuts against one of the rotation restricting members 51 to restrict further rotation. Also, when the rotating member 32 reaches the rotational angle corresponding to clutch disengagement, the other side of the teeth of the worm wheel 50 abuts against the other of the rotation restricting members 51 to restrict further rotation.

Figure 8:
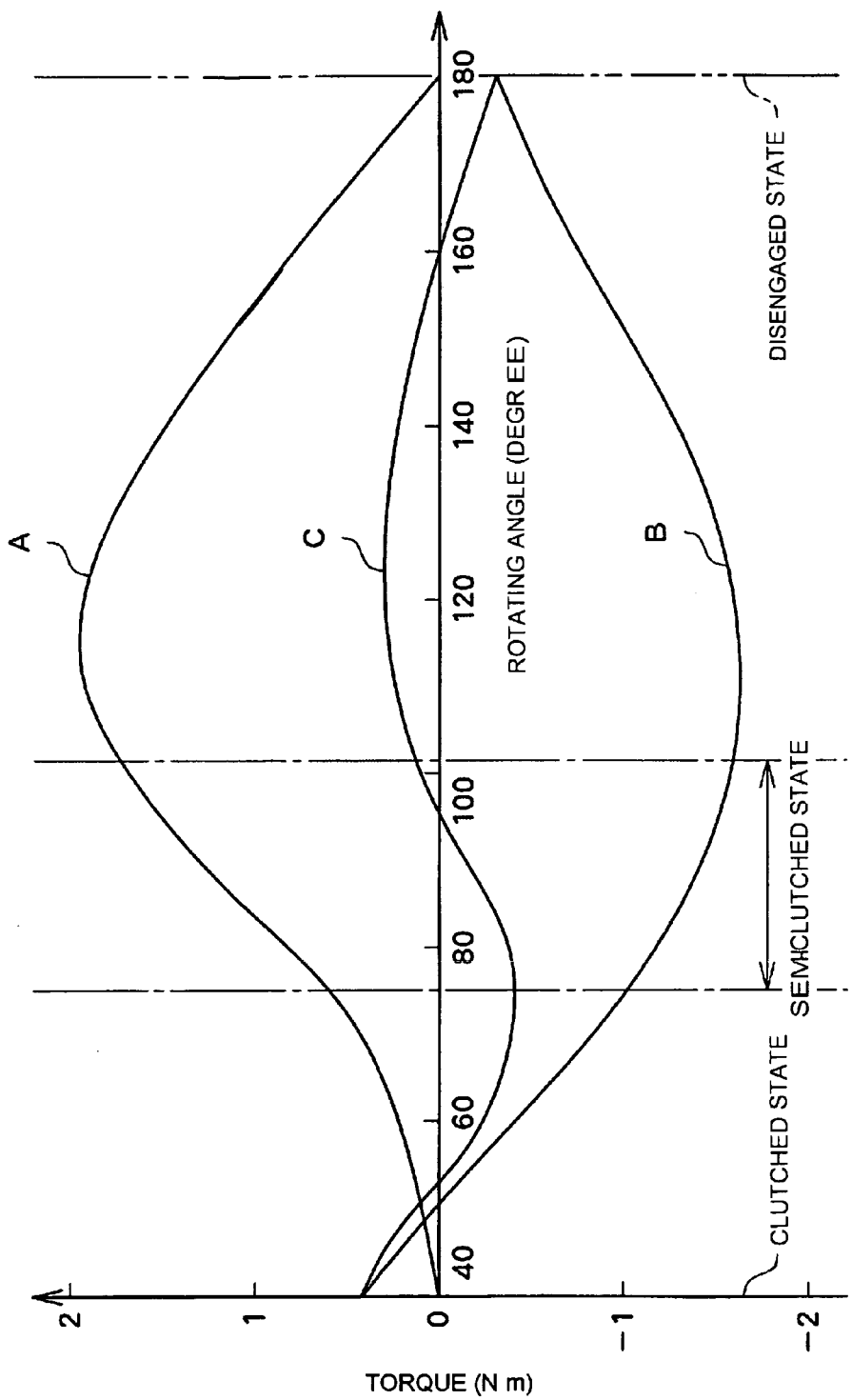
FIG. 8 is a graph illustrating the relationship among torque imparted to a rotating member from a clutch side, torque imparted to a rotating member by an auxiliary biasing mechanism, and a composite torque thereof.

FIG. 8 is a graph illustrating the relationship among the torque (curve A) imparted to the rotating member 32 by the second piston push rod 34 (under the force of the clutch spring), the torque (curve B) imparted to the rotating member 32 by the auxiliary spring 22, and a composite torque thereof (curve C). The Y-axis on the graph indicates a torque value. A negative value indicates a torque acting to rotate the rotating member 32 clockwise in FIGS. 4 and 5 to push the second piston push rod 34 toward the master cylinder 40, thereby disengaging the clutch 10. A positive value indicates a torque acting to rotate the rotating member 32 counterclockwise in FIGS. 4 and 5 to return the second piston push rod 34 towards its original position, thereby engaging the clutch 10. The X-axis in the graph indicates a rotational angle of the rotating member 32. In the illustrated embodiment, the clutch is engaged when the rotational angle is 40 degrees, and the clutch is disengaged when the rotational angle is 180 degrees.

With reference to curve A in the figure, the torque imparted to the rotating member 32 by the second piston push rod 34 at 40 degrees (corresponding to a clutch engaged position) is zero (or thereabout) as a result of the clutch spring relaxing to a substantially unloaded state. When the rotating member 32 is rotated in a direction of clutch disengagement (clockwise), the torque represented by curve A gradually increases to resist the clockwise rotation of the rotating member 32. That is, rotation of the rotating member 32 causes the piston 36 to move leftward in FIG. 4, thereby loading the clutch spring. The clutch spring force produces a positive torque on the rotating member 32 (e.g., a torque in the counterclockwise direction). Thereafter, as the rotating member 32 continues to rotate, a distance (or moment arm) between a rotational axis of the rotating member 32 and a vector of the clutch spring force first increases and then begins to decrease. The vector of the clutch spring force extends along the longitudinal axis of the second piston push rod 34. As a result of this decreasing moment arm, the torque on the rotating member 32 produced by the clutch spring begins to decrease as the rotating member 34 continues to rotate clockwise. In a disengaged state of the clutch 10, the vector of the clutch spring force extends through the rotational axis of the rotating member 32 so as to produce zero torque on the rotating member 32. That is, while the clutch spring is fully loaded, its produces no or substantially no torque on the rotating member 32 because the clutch spring force vector intersects with the rotational axis of the rotating member. There is no movement arm (or a very small one) at the state of clutch disengagement.

Curve B shows the torque acting on the rotating member 32 that is caused by the auxiliary spring 22. This torque will herein be referred to as an "assist torque." At the state of clutch engagement (e.g., the 40 degree position of the rotating member), the auxiliary spring is loaded and produces an auxiliary spring force vector that extends to the left side of the rotational axis of the rotating member 32 in FIG. 4. As such, the auxiliary spring 22 produces a positive assist torque, thereby promoting clutch engagement (e.g., biasing counterclockwise rotation of the rotating member 32). When the rotating member 32 is rotated in a direction of clutch disengagement (e.g., clockwise), the positive assist torque decreases to zero as the moment arm between the auxiliary spring force and the rotational axis shrinks to zero. Further rotation of the rotating member 32 produces a moment arm between the auxiliary spring force and the rotational axis on the other side of the rotational axis (e.g., on the right side in FIG. 4). Consequently, the auxiliary spring 22 generates a negative assist torque on the rotating member 32, thereby assisting to disengage the clutch 10. The negative assist torque continues to increase with rotation of the rotating member 32 despite the additional clockwise rotational movement unloading of the auxiliary spring 22. The increase in the negative assist torque continues through a range of rotation that corresponds to a semi-clutch state as the moment arm continues to increase. Further rotation of the rotating member 32 in the clockwise direction beyond the semi-clutched stated causes the negative assist torque to decrease as a consequent of further unloading of the auxiliary spring 22 and/or a decrease of the corresponding moment arm. Once the rotating member 32 has rotated to a position corresponding to the disengaged state (e.g., 180 degrees in the illustrated embodiment), the auxiliary spring 22 remains loaded, but only slightly. The moment arm also has decreased so as to produce only a small amount of negative assist torque on the rotating member 32.

As represented by curve C in the FIG. 8, the torque imparted by the second piston push rod 34 and the torque imparted by the auxiliary spring 22 act in opposite directions to offset each other over a substantial portion of the rotating member's motion. Therefore, an absolute value of torque imparted to the rotating member 32 becomes a relatively small value, so that the motor 44 can readily drive the rotating member 32. Also, at the rotational angle of engagement (i.e., a clutched state), the composite torque acts in a direction of clutch engagement (e.g., counterclockwise in the illustrated embodiment). Therefore, the members (e.g., plates) of the clutch 10 remain biased towards one another during the engaged state (i.e., clutched state) to stabilize this operational state of the clutch 10. Also, at the rotational angle of disengagement (i.e., unclutched state), the composite torque acts in a direction of clutch disengagement (e.g., clockwise in the illustrated embodiment). Therefore, the members (e.g., plates) of the clutch 10 remain biased apart from one another during the disengaged state (i.e., unclutched state) to stabilize this operational state of the clutch 10. Further, at rotational angles corresponding to the semi-clutched state of the clutch 10, torque in a direction of clutch engagement is generated as the rotating member 32 rotates in a direction of clutch disengagement, and torque in a direction of clutch disengagement is generated as the rotating member 32 rotates in a direction of clutch engagement. As a consequent of the composite torque counteracting rotational movement of the rotating member 32 through the rotational range corresponding to the semi-clutched state, the clutch 10 has increased stability in the semi-clutched state as compared to prior clutch actuator mechanisms.

Accordingly, the clutch actuator 11 provides enhance stability of the clutch's position in the three noted operating state (clutched, unclutched, and semi-clutched) even without application of a rotational driving force sufficient to rotate the rotating member 32. Additionally, the rotating member 32 in the illustrated embodiment is stable at all rotational angles. Friction occurs at various locations in within the mechanism to help maintain the position of the rotating member 32 once a sufficient driving force is discontinued. Also, a self-locking effect of a certain degree is produced between the worm wheel 50 and a worm gear 52, so that even when torque is imparted to the rotating member 32, the worm gear 52 resists such rotation to back drive the motor. Because of such friction and mechanical leverage, as well as because of the relative small value of the composite torque (curve C) acting on the rotating member 32 regardless of the rotational direction, the clutch actuator 11 can maintain an established clutch state or position with the motor 44 stopped at any rotational angle of the rotating member 32.

Further, with the clutch control system described above, the hydraulic mechanism causes the clutch 10 to engage and disengage. The piston 36 of the master cylinder 40, which is part of the hydraulic mechanism, can be pushed by either the second piston push rod 34, which is driven by the motor 44, or by the manipulation arm 58. Consequently, engagement and disengagement of the clutch 10 can be made stably by manual operation or by the motor 44 even when the clutch 10 wears and oil in the hydraulic mechanism varies in volume. Also, it suffices that the reservoir tank 42 be connected to the master cylinder 40, so as not to complicate the construction of the device.

Figure 6:
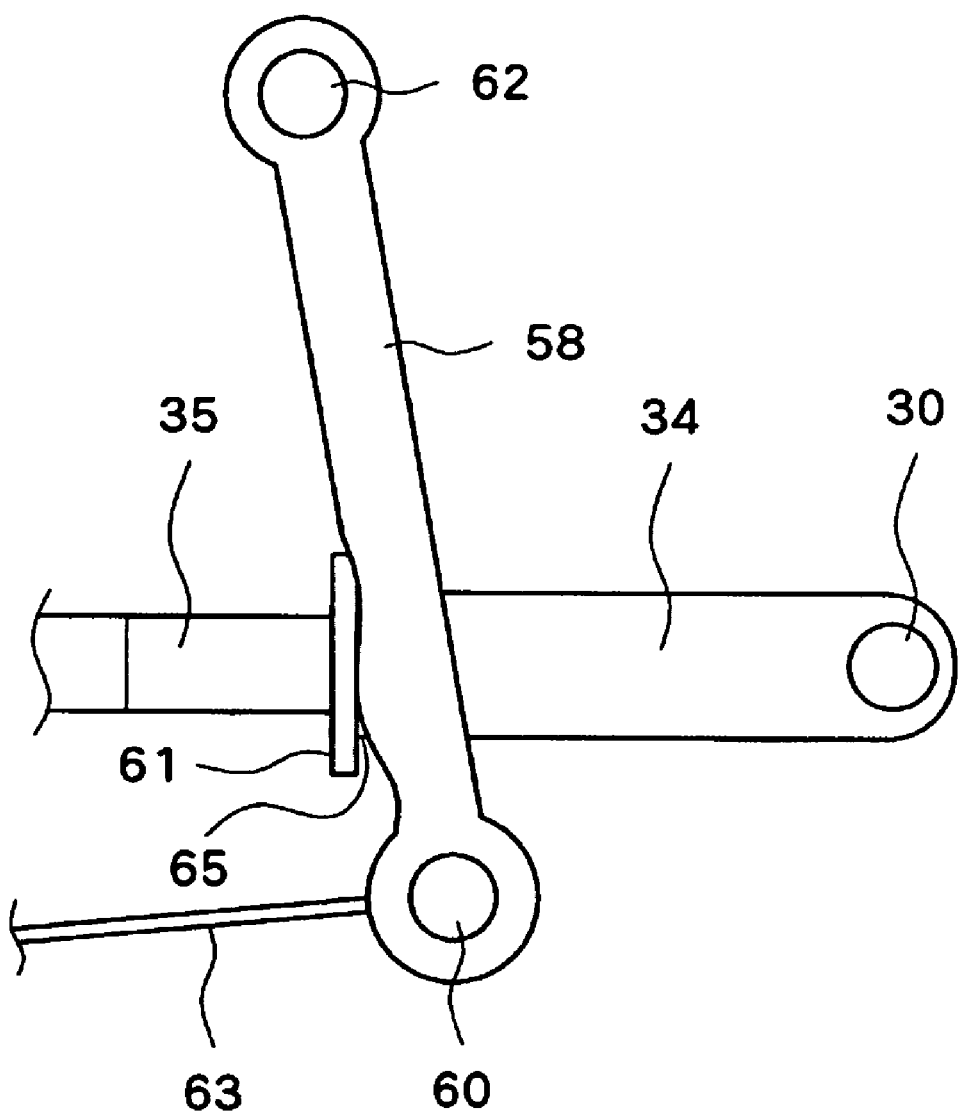
FIG. 6 is a schematic view showing a motion of a manipulation arm of the clutch actuator mechanism with the arm in a position corresponding to an engaged state of the clutch.
Figure 7:
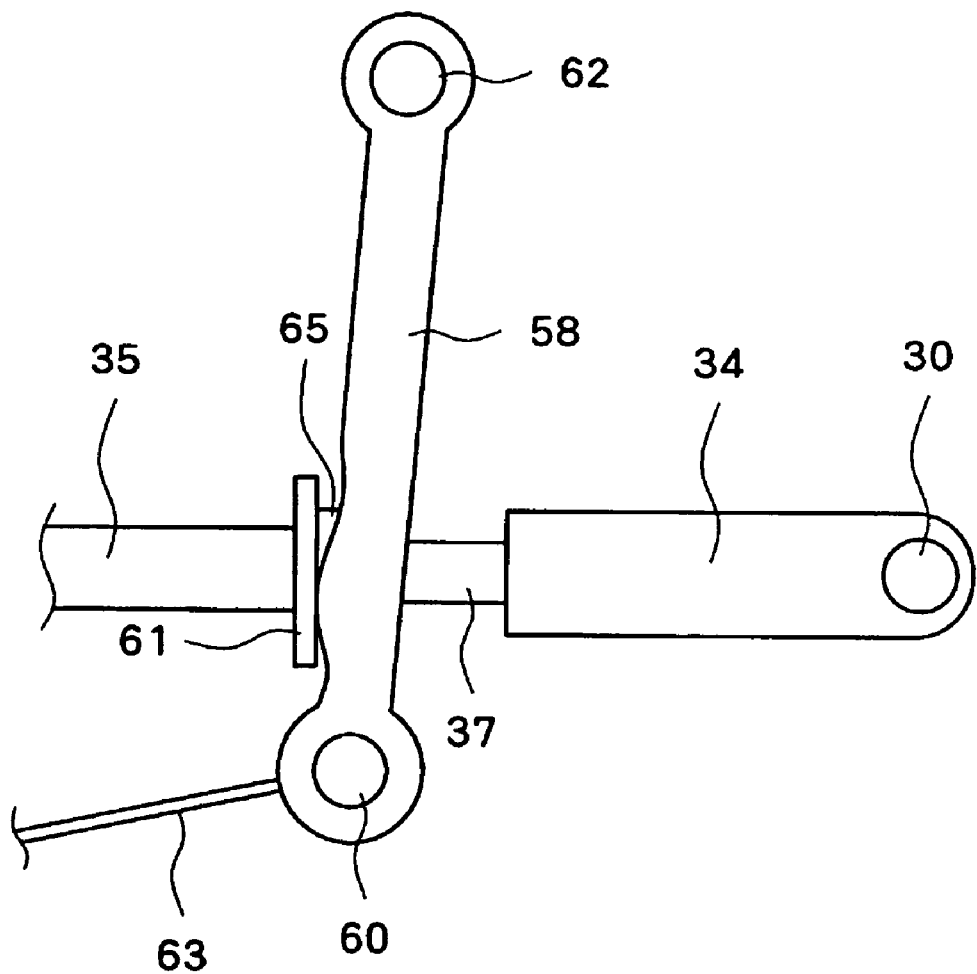
FIG. 7 is a view showing a motion of the manipulation arm with the arm in a position corresponding to a disengaged state of the clutch.

With reference again to FIGS. 4-7, in a state in which the clutch lever 104 is not manipulated, the manipulation arm 58 is in a position (an initial position shown in FIG. 6), in which the first piston push rod 35 is not pushed. In a state, in which the clutch lever 104 is manipulated, the manipulation arm 58 pushes the first piston push rod 35 into the master cylinder 40 whereby the first piston push rod 35 is pulled out from the second piston push rod 34 and the actuator abutment 65 is separated from the tip end surface of the second piston push rod 34. Also, when the rotating member 32 is rotated in a direction of clutch disengagement by the motor 44, the first piston push rod 35 is pushed into the master cylinder 40 and the actuator abutment 65 is separated from the opening 56 of the manipulation arm 58 (as seen in FIG. 5). Therefore, the second piston push rod 34 and the manipulation arm 58 can each push the first piston push rod 35. Thereby, even in the case where, for example, an engine of the vehicle stops and the drive wheel is locked, it is possible to readily disengage the clutch 10 with the use of the manipulation arm 58.

The above-described systems and methods can also be used with other types of transmissions, clutch mechanisms and associated control systems and routines, such as those described in one or more of the following co-pending U.S. patent applications: (1) application Ser. No. 11/301,282, filed on Dec. 12, 2005, which is entitled STRADDLE-TYPE VEHICLE HAVING CLUTCH CONTROL DEVICE AND METHOD OF USING CLUTCH CONTROL DEVICE; (2) application Ser. No. 11/301,288, filed on Dec. 12, 2005, which is entitled STRADDLE-TYPE VEHICLE HAVING CLUTCH ENGAGEMENT CONTROL DEVICE AND METHOD OF USING CLUTCH ENGAGEMENT CONTROL DEVICE; (3) application Ser. No. 11/299,720, filed on Dec. 12, 2005, which is entitled APPARATUS AND METHOD FOR CONTROLLING TRANSMISSION OF STRADDLE-TYPE VEHICLE; and (4) application Ser. No. 11/299,858, filed on Dec. 12, 2005, which is entitled GEAR CHANGE CONTROL DEVICE AND METHOD. The contents of all of the above-noted co-pending U.S. patent applications are hereby incorporated by reference in their entireties.

Figure 9:
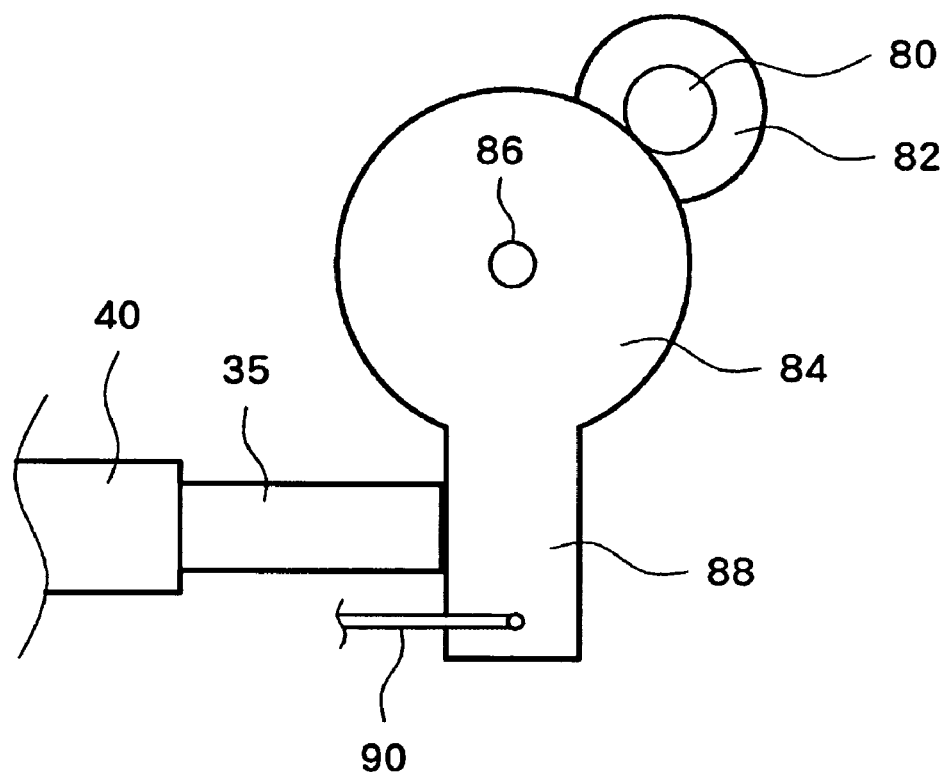
FIG. 9 is a view showing a modified mechanism of a clutch actuator.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. For example, while the above-described mechanism converts rotational movement of the worm wheel 50 into linear movement of the second piston push rod 34 to thereby push the piston 36 of the master cylinder 40, a motor 82 can rotate a pinion gear 80 as shown in FIG. 9, which in turn rotates a rotating member 84. The rotating member 84 has an outwardly extending piston pushing part or arm 88 and is rotationally supported by a shaft 86. The piston pushing part 88 acts against a head of the first piston push rod 35 to push the piston 36. In this case, it is preferable that the piston pushing part 88 mounts at a tip end thereof a length of wire 90 connected at the other end thereof to the clutch lever 104 to enable rotating the rotating member 84 manually.

In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A clutch actuator mechanism for operating a vehicle clutch between at least an engaged state and a disengaged state, the clutch actuator mechanism comprising:

an actuator;

a rotating member rotationally driven by the actuator about an axis;

a clutch operating member having at least first and second end sections, the first end section arranged to work against a clutch biasing member, which biases the clutch toward the engaged state, at least during the disengaged state, and the second end section engaging with the rotating member at a location offset from the axis; and an auxiliary biasing member having first and second end sections, the first end section being coupled to the rotating member at a location also offset from the axis and spaced apart from the first end section of the clutch operating member, and the second end section of the auxiliary biasing member being generally fixed;

whereby rotation of the rotating member in a first direction causes the clutch operating member to move through a range of motion from a first position to a second position, the first position corresponding to the disengaged state of the clutch and the second position corresponding to the engaged state of the clutch, and the auxiliary biasing member and the clutch operating member are arranged so as to work together against the clutch biasing member through at least a portion of the range of movement as the rotating member rotates in the first direction;

the clutch actuator mechanism additionally comprising a manually operated lever coupled to at least the first end section of the clutch operating member, the manually operated lever being arranged to move the first end section of the clutch operating member in a direction towards a position corresponding to the disengaged state.

2. The clutch actuator mechanism according to claim 1, wherein the rotating member rotates in a second, reverse direction to move the clutch operating member in a direction of clutch disengagement, and the auxiliary biasing member and the clutch operating member are arranged so as to work together against the clutch biasing member through at least a portion of the rotational movement of the rotating member in the second, reverse direction.

3. The clutch actuator mechanism according to claim 2, wherein the second end section of the clutch operating member is arranged to exert a first torque on the rotating member under the force of the clutch biasing member at least during a semi-clutched state of the clutch, and the auxiliary biasing mechanism is arranged to exert a second torque on the rotating member at least during the semi-clutched state, and the first and second torques being generally of equal by opposite value to each other during at least the semi-clutched state.

4. The clutch actuator mechanism according to claim 1 additionally comprising:
wherein the rotating member comprises an integral worm wheel and a shaft, the shaft coupling the rotating member with the worm wheel such that the worm wheel, the shaft and the rotating member all rotate together; and
wherein the actuator comprises a worm gear that meshes with the worm wheel and is rotated by a motor.

5. The clutch actuator mechanism according to claim 4 additionally comprising a base member fixed relative to a straddle-type vehicle, and
wherein the actuator and the rotating member are mounted on the base.

6. The clutch actuator mechanism according to claim 1, wherein the second end of the auxiliary biasing mechanism is pivotally fixed.

7. The clutch actuator mechanism according to claim 1, wherein the auxiliary biasing mechanism comprises a compression spring disposed between the first and second end sections.

8. The clutch actuator mechanism according to claim 1, wherein a longitudinal axis of the clutch actuating member lies at a skewed position relative to a longitudinal axis of the auxiliary biasing mechanism.

9. The clutch actuator mechanism according to claim 1 additionally comprising a master cylinder having a piston, the first end section of the clutch operating member being engaged with the piston in a manner permitting the first end section to act against the piston yet pivot relative to piston.

10. The clutch actuator mechanism according to claim 9, wherein a ball-socket connection couples the first end section of the clutch operating member with the piston of the master cylinder.

11. The clutch actuator mechanism according to claim 1, wherein the auxiliary biasing mechanism is arranged to produce a force on the rotating member having a vector that intersects with the axis at a rotational position of rotating member between its positions corresponding to the engaged and disengaged states.

12. The clutch actuator mechanism according to claim 1, wherein the auxiliary biasing mechanism is arranged so as to produce a torque on the rotating member in a direction promoting clutch engagement at least when the rotating member lies in a position corresponding to the engaged state of the clutch, and to produce a torque on the rotating member in a direction promoting clutch disengagement at least when the rotating member lies in a position corresponding to the disengaged state of the clutch.

13. The clutch actuator mechanism according to claim 1, wherein the clutch operating member is arranged so as to produce substantially no torque on the rotating member when the rotating member lies in a position corresponding to the engaged state.

14. The clutch actuator mechanism according to claim 1, wherein the clutch operating member is arranged to arranged to produce a force on the rotating member having a vector that intersects with the axis at a rotational position of rotating member corresponding to the engaged state.

15. The clutch actuator mechanism according to claim 1, wherein the second end section of the clutch operating member is pivotally coupled to the rotating member at the location offset from the axis.

16. A clutch actuator mechanism for operating a vehicle clutch between at least an engaged state and a disengaged state, the clutch actuator mechanism comprising:
an actuator;
a master cylinder coupled to the clutch, the master cylinder including a piston that is biased toward the engaged state by a clutch biasing mechanism;
transmission means for transferring movement of the actuator to the piston of the master cylinder to establish at least a disengaged condition of the clutch, the means further transferring substantially no force from the clutch biasing mechanism back toward the actuator at least during the engaged state; and
a manually operated lever arranged to move the piston of the master cylinder toward a position corresponding to the engaged state independent of the actuator.

17. The clutch actuator mechanism according to claim 16, wherein said transmission means further applies a force biasing the clutch into engagement at least during the engaged state.

18. The clutch actuator mechanism according to claim 17, wherein said transmission means further produces a force resisting clutch movement at least during a semi-clutch state.

19. The clutch actuator mechanism according to claim 16 additionally comprising a base member fixed relative to a straddle-type vehicle, wherein the actuator and said transmission means are mounted on the base.

* * * * *

UNITED STATES PATENT AND TRADEMARK OFFICE
CERTIFICATE OF CORRECTION

| | | |
|---|---|---|
| PATENT NO. | : 7,451,864 B2 | Page 1 of 1 |
| APPLICATION NO. | : 11/301646 | |
| DATED | : November 18, 2008 | |
| INVENTOR(S) | : Makoto Kosugi | |

It is certified that error appears in the above-identified patent and that said Letters Patent is hereby corrected as shown below:

At column 1, line 9, Change "Dec. 10, 2005," to --Dec. 10, 2004,--.

At column 12, line 31-32, In Claim 14, after "arranged to" delete "arranged to".

Signed and Sealed this

Thirtieth Day of March, 2010

David J. Kappos
*Director of the United States Patent and Trademark Office*